April 28, 1953      E. W. FAHEY      2,636,624
EGG HANDLING DEVICE
Filed Dec. 3, 1947
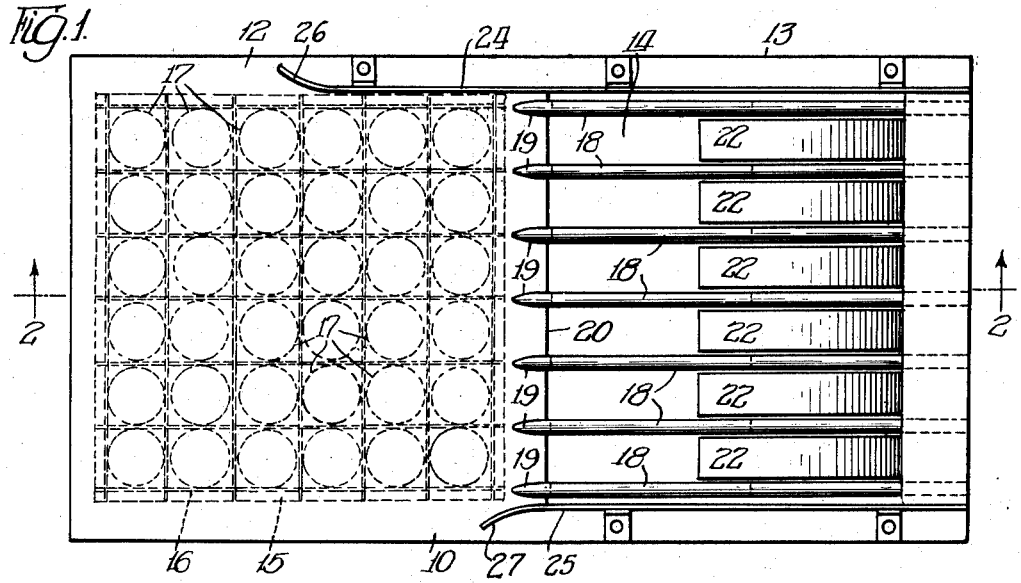
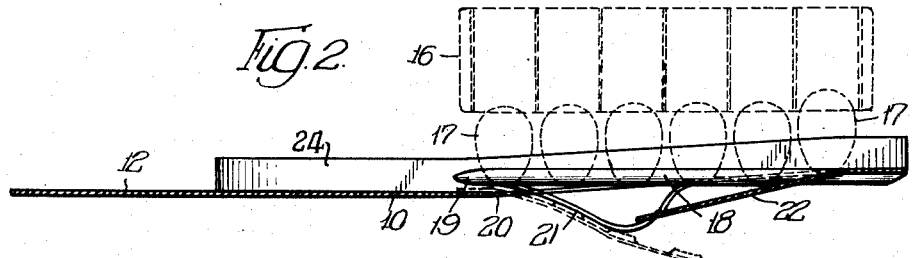
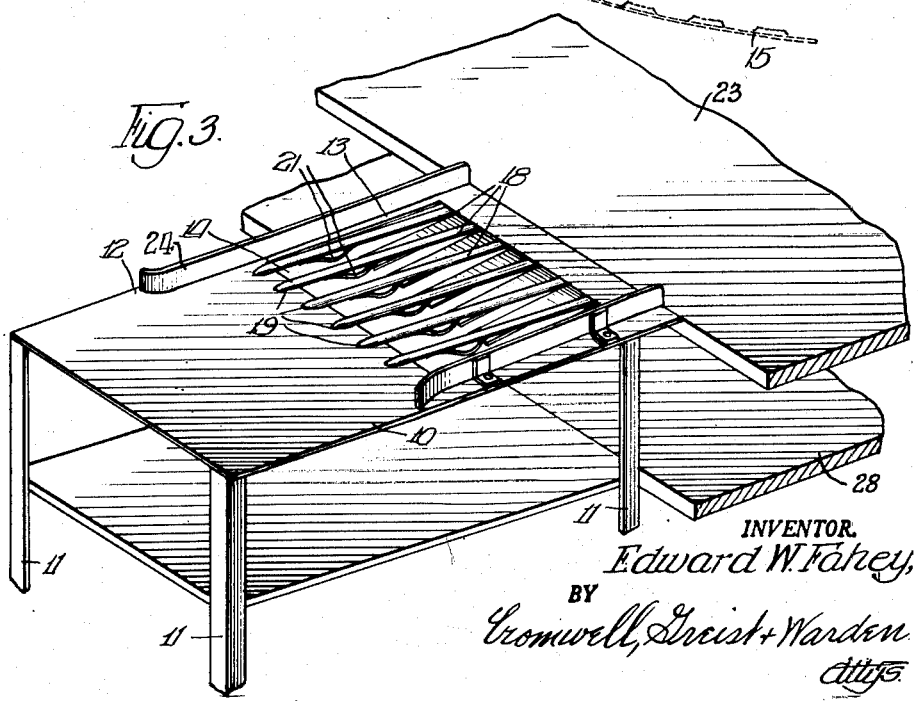
INVENTOR.
Edward W. Fahey,
BY Cromwell, Greist + Warden
Attys.

Patented Apr. 28, 1953

2,636,624

UNITED STATES PATENT OFFICE 2,636,624

EGG HANDLING DEVICE

Edward W. Fahey, Chicago, Ill., assignor to Shellmar Products Corporation, Chicago, Ill., a corporation of Delaware Application December 3, 1947, Serial No. 789,440

3 Claims. (Cl. 214—300)

This invention is concerned with improvements in egg handling equipment.

In the handling of eggs bulk shipments are customarily made in standard containers or cases generally of 30-dozen capacity, in which the eggs are packed in cell-like partition members or fillers and the fillers are arranged in tiers in the case being separated by separator members or flats. When eggs are received in such cases by the packer they are unpacked by removing each filler and its supporting flat as a unit and then separating the eggs from the filler and the flat for candling and packing or other processing. Since the eggs have a tendency to stick in the filler, particularly if they are large size, when they are being separated, the process of removing them from the fillers and separating the flats and fillers by hand ordinarily involves considerable labor and much handling, frequently resulting in relatively high percentage of breakage.

The general object of the invention is to provide a device for facilitating the separation by hand of the eggs from the flat and filler members, after the removal of the same from the case, which reduces the amount of labor involved in this operation.

It is a more specific object of the invention to provide a tray-like device having separator elements arranged thereon whereby an egg filler and flat assembly may be moved by hand into the operative zone of the separator elements in such a manner that the flat is separated from both the filler and the eggs and the separation of the eggs from the filler is greatly facilitated.

It is a still more specific object of the invention to provide a tray-like device having a plurality of transversely spaced rod-like separator elements arranged over an aperture in one end of the tray with the free ends of the rods spaced slightly above the bottom of the tray whereby an egg filler and flat assembly having a plurality of eggs therein may be moved longitudinally of the tray so that the rod-like separator elements will divert the flat through the aperture in the tray and the filler with the eggs therein will be moved into position over the rod-like elements whereby the filler may be lifted by hand to remove the eggs therefrom and leave them resting on the rod-like separator elements for ready removal to an adjacent packing table, or the like, by the hands of the operator.

These and other objects of the invention will be apparent from a description of the preferred form thereof which is shown by way of illustration in the accompanying drawings, wherein:

Fig. 1 is a plan view of a separator device embodying the principles of the invention;

Fig. 2 is a longitudinal section on the line 2—2 of Fig. 1 with the eggs shown separated from the filler and the flat; and Fig. 3 is a perspective view of the device.

Referring to the drawings, the preferred form of the device comprises a generally rectangular tray 10 which may be supported in any conventional manner by legs 11 or other frame structure. The tray 10 includes a forward portion 12 which is flat and arranged in approximately level position and an upwardly sloping or inclined portion 13. The inclined portion 13 is provided with an aperture 14 of sufficient size to permit the passage of an egg flat member 15 of standard size. The flat 15, which is illustrated as the molded pulp type having shallow cup-like formations or pockets for receiving the ends of the eggs, constitutes the supporting member of an assembly (indicated in dotted lines in Figs. 1 and 2) which also includes the filler 16 and a plurality of eggs 17, the eggs being arranged in the cellular spaces provided by the filler with their ends supported in the cup-like formations in the flat member.

Arranged in transversely spaced generally parallel relation over the aperture 14 in the tray portion 13 are a plurality of separator rods 18 having pointed ends 19 which extend slightly forwardly of the front edge 20 of the aperture 14. The ends 19 of the rods 18 are positioned in spaced relation to the bottom of the flat forward portion 12 of the tray and a sufficient distance above the same to separate the flat member from the eggs and filler members and permit the passage of the flat member. The rods 18 are preferably rubber covered or provided with a resilient surface of similar material to minimize breakage.

Beneath the forward end 19 of each rod 18 there is provided a curved or deflecting member 21 which is adapted to engage the leading edge of the egg flat member 15 as it is moved between the rods 18 and the tray bottom to insure the downward movement of the flat member 15. The rods 18 are preferably anchored to the tray with their top surfaces merged into the top surface of the tray adjacent the end of portion 13.

Downwardly directed plate-like members 22 extend forwardly of and fill the space between the rod-like members 18 terminating short of the bowed egg flat deflecting members 21. The members 22 which act as a ramp for assisting in the movement of the eggs from the end of the tray to an adjacent handling table 23 or the like, are preferably covered with a resilient material such as rubber or the like. Side guide plates 24 and 25, provided with outwardly turned ends 26 and 27, respectively, are arranged along the front and rear sides of the tray 10 to guide the assembly as it is moved into the operative zone of the separator rods 18.

In operation, an egg assembly consisting of a flat 15, filler 16 and eggs 17 is placed on the top of the forward portion 12 of the tray and moved, by hand, over the separator rods 18 which separate the eggs from the cup-shaped formations and deflect the flat 15 downwardly through the aperture 14 and onto a receiving table 28, or the like. The operator gently shakes the filler 16 to insure release of the eggs 17 and at the same time lifts the filler 16 vertically away from the separator rods 18 leaving the eggs 17 resting loosely on the spaced rods 18, from which they may be readily removed by a raking action of the operator's hand to the adjacent supporting member or table 23, assisted by the upwardly sloping plate members 22. The filler member 16 may, of course, be removed as desired.

While specific details of construction and materials have been referred to in describing the preferred form of the invention it will be understood that other details of construction and other materials may be resorted to within the spirit of the invention.

I claim:

1. A device for use in separating eggs from an egg flat and filler assembly comprising a tray-like member having a portion provided with an aperture in the bottom thereof of sufficient width to pass edgewise the egg flat member and a plurality of rod-like separator members arranged in transverse spaced relation over the aperture, said separator members having their free ends spaced a sufficient distance above the bottom of the tray-like member to enter between the egg flat member and the egg filler member when an assembly is moved along the bottom of the tray-like member and against the free ends of the separator members to thereby separate the flat and filler members, said separator members being fixed at their opposite ends in merging relation to the bottom plane of the tray-like member and upwardly sloping plate members provided between the separator members adjacent the fixed ends thereof which provide a ramp structure for facilitating the removal by hand of the loose eggs from the separator members after they have been released from the filler member and deposited thereon.

2. A device as recited in claim 1 wherein the separator members and the ramp-like plate members are provided with resilient surfaces to minimize breakage of the eggs by contact therewith.

3. A device for use in separating eggs from an egg flat and filler assembly comprising a tray-like member having a portion provided with an aperture in the bottom thereof of sufficient width to pass edgewise the egg flat member and a plurality of rod-like separator members arranged in transverse spaced relation over the aperture, said separator members having their free ends spaced a sufficient distance above the bottom of the tray-like member to enter between the egg flat member and the egg filler member when an assembly is moved along the bottom of the tray-like member and against the free ends of the separator members thereby to separate the flat and filler members, plate members having a downwardly sloping surface adjacent the free ends of said separator members to engage the leading edge of the flat member and direct the same downwardly away from said separator members, said separator members being fixed at their opposite ends in merging relation to the bottom plane of the tray-like member and ramp forming members arranged between the separator members adjacent the fixed ends thereof and having upwardly sloping surfaces extending from adjacent the lowermost portion of said plate members for facilitating the removal by hand of the loose eggs from the separator members after they have been released from the filler and flat members and deposited on the separator members.

EDWARD W. FAHEY.

References Cited in the file of this patent

UNITED STATES PATENTS

| Number | Name | Date |
| --- | --- | --- |
| 612,375 | Bennett | Oct. 11, 1898 |
| 1,279,563 | Lowell | Sept. 24, 1918 |
| 1,866,809 | Kasser | July 12, 1932 |
| 2,074,383 | Funk | Mar. 23, 1937 |
| 2,481,440 | Page | Sept. 6, 1949 |